Feb. 26, 1957 G. W. WATSON Re. 24,283

METHOD OF BALANCING CURRENT VOLUME AND STEAM GENERATION
BY USE OF CURRENT CONDUCTING FILMS
Original Filed Jan. 4, 1954

INVENTOR.
GLENN W. WATSON
BY Everett G. Wright
ATTORNEY.

United States Patent Office

Re. 24,283

Reissued Feb. 26, 1957

24,283

METHOD OF BALANCING CURRENT VOLUME AND STEAM GENERATION BY USE OF CURRENT CONDUCTING FILMS

Glenn W. Watson, Detroit, Mich., assignor to Detroit Wabeek Bank and Trust Co., Detroit, Mich., a corporation of Michigan Original No. 2,748,254, dated May 29, 1956, Serial No. 402,010, January 4, 1954. Application for reissue October 29, 1956, Serial No. 619,096

7 Claims. (Cl. 219—40)

Figure 1:
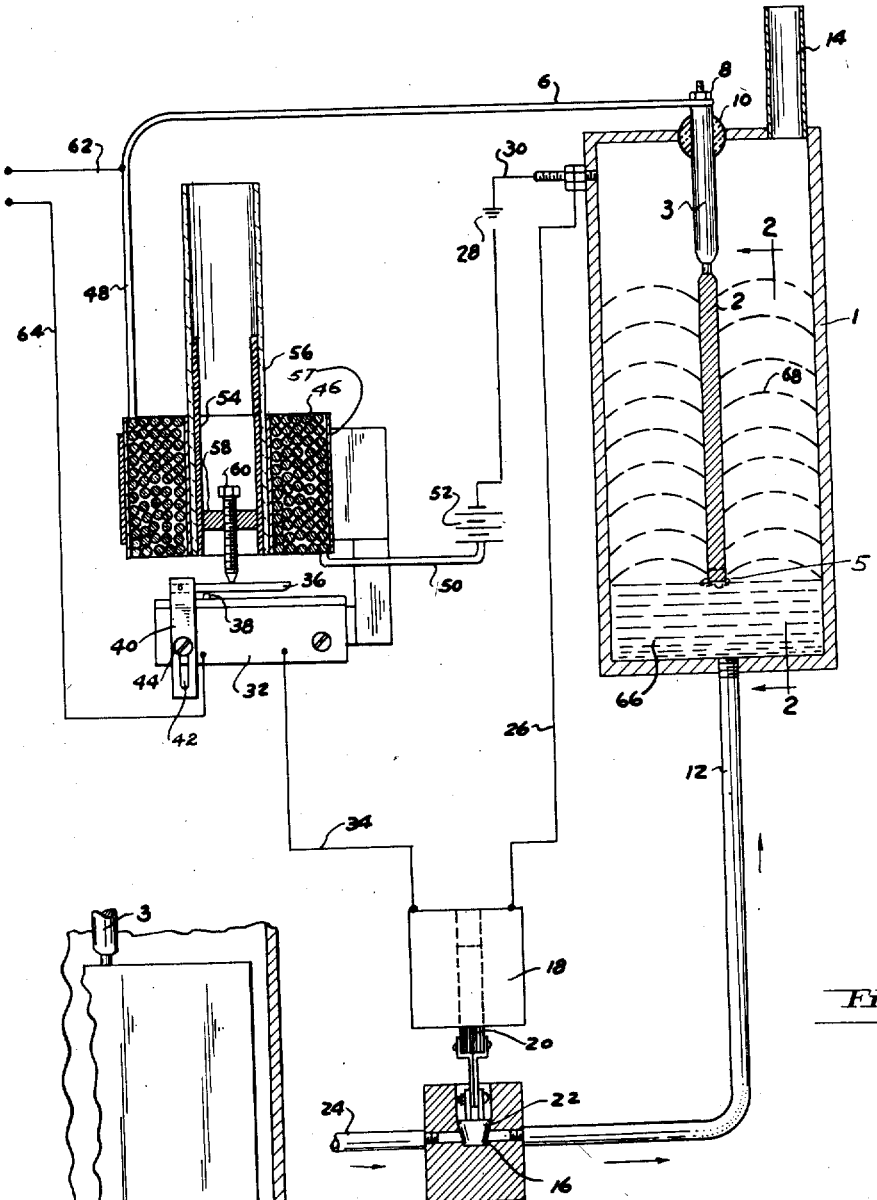

Matter enclosed in heavy brackets [ ] appears in the original patent but forms no part of this reissue specification; matter printed in italics indicates the additions made by reissue.

The present invention pertains to an automatic current flow balancing and regulating method for an electronic vapor generator, particularly of the type as shown in my U. S. Patent No. 2,451,594, of October 19, 1948.

The device as shown in this patent includes a conducting receptacle and a conductor suspended in the receptacle and terminating at a relatively short distance from the bottom thereof. The liquid in the bottom of the receptacle is originally conductive or is made slightly conductive. The spacing of the electrode from the wall of the receptacle is such that, when current flows in the liquid at the bottom of the receptacle, films of liquid will rise in the space between the electrode and the walls of the receptacle. These films are conductors and consumers of current and are instantly vaporized as described in the patent. The quantity of current flowing in the system varies according to the height of the column of films, or the number of film consumers in the circuit.

The principal object of this invention is to provide a constancy of current consumption with an apparatus that makes use of this phenomenon as a control for the flow of liquid into the receptacle, and hence the number of films. When the column of films has reached a predetermined maximum quantity, there is sufficient liquid in the receptacle, and the inlet should then be closed; conversely, when the column of films has fallen to a predetermined minimum quantity, the inlet should be opened.

In the accomplishment of this object and in accordance with these requirements, the liquid intake to the receptacle is controlled by a solenoid valve. The solenoid is energized and deenergized by operation of a switch which in turn is governed by the strength of the current flowing through the system. A micro-switch is employed for this purpose, and its lever is actuated by an armature which is displaced by a coil connected in the circuit.

The liquid valve is normally open, when the device is in operation, and the micro-switch is normally closed. These conditions prevail when less than maximum current flows through the system, that is, when the column of films is at less than its maximum quantity. When the maximum quantity is reached, the current strength in the system is at maximum, and the parts are so adjusted that at this time the coil displaces the armature therein to open the micro-switch and de-energize the solenoid of the valve, whereupon the valve closes. When the column of films has dropped due to vaporization to a point signifying that more liquid is required in the receptacle, the current strength has dropped sufficiently to permit the parts to return to the described normal position wherein the intake valve is opened.

The invention is fully described by way of example in the following description and in the accompanying drawings in which—

Figure 2:
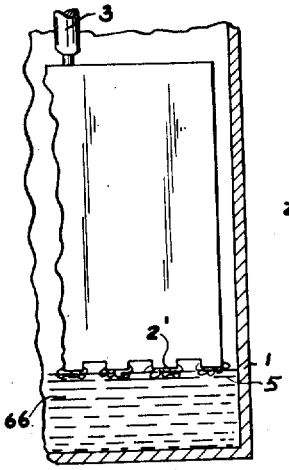

Figure 1 is a vertical section of the apparatus, showing also the wiring diagram, and Figure 2 is a section on the line 2—2 of Figure 1, showing the liquid at a somewhat depressed level.

In Figure 1 is shown a steam generator of the general type shown and described in my United States Patents No. 2,451,594 of October 19, 1948, and No. 2,510,672 of June 6, 1950. In view of these disclosures a brief description of the instant generator will suffice.

A vessel 1 has an electrode 2 supported axially therein and may be in the form of a vertical oblong plate spaced between parallel walls as shown in the drawing and forming an integral generator and boiler, or mounted within the boiler chamber, in the form of hollow cylinders as in the aforementioned patents.

The lower edge of the electrode is formed with tips 2' that initially touch the surface of the liquid and thereafter in operation engage only the small baskets 5 of film formed beneath the tips.

The upper end of the electrode is formed as a rod 3 passing through the top of the receptacle and secured therein by suitable fastening means. A conductor 6 is secured to the fastening means or the rod 3 by a clamping nut 8, and the rod 3 is insulated at 10 from the top of the receptacle. A water inlet pipe 12 extends to the bottom of the vessel 1, and a steam outlet 14 extends from the top to the point or points where steam is to be used, such as radiator, boilers and the like.

The pipe 12 has a valve seat 16 controlled by a solenoid valve. The latter comprises a winding 18 within which is an armature 20 carrying one end with a valve plug 22 adapted to engage the seat. This valve is conventional in character. Water is admitted to the opposite end 24 of the pipe 12 from a tank or other source. One end of the winding 18 is joined by a conductor 26 to ground at 28, and the conducting wall of the vessel 1 is also connected to ground by a conductor 30.

Current in the solenoid 18 is controlled by a micro-switch 32 joined by a conductor 34 to the remaining end of the solenoid. The micro-switch is of conventional design which will now be described. The actuating lever 36 of the switch has a fixed fulcrum 38 on the body of the switch. One end of the arm 36 is pivoted to a suspended plate 40 having a vertical slot 42. A screw 44 passed through the slot into the body of the switch enables vertical adjustment of the plate on the body and enables adjustment of the lever arms of the member 36 by pivotal adjustment of the plate 40 on the screw 44.

Above the arm 36 is a coil 46 of enameled heavy wire of about one-eighth inch diameter. One end of the winding is connected at 48 to the conductor 6 and the other end by a conductor 50 to a power source 52.

In the coil 46 is mounted a tubular armature 54 set in an insulating sleeve 56. The coil is supported by an insulated bracket 57. In the armature is secured a brass nut 58 through which is threaded a brass screw 60 extending outward of the armature and resting on the arm 36. By means of the screw, the position of the armature 54 in the coil may be regulated, with the result that various current strengths may be required to operate the switch 32. The usual return spring (not shown) within switch 32 presses upward on arm 36. Conductors 62 and 64 extend respectively from the conductor 48 and the remaining terminal of the switch 32 to a thermostat or other switches for controlling the flow of current in the shunt circuit that includes the switch 32 and the winding 18.

In the operation of the device, when the body of water or other liquid 66 in the bottom of the vessel 1 engages the lower end of the electrode 2, with current available thereto, water films 68 will rise in the spaces between the electrode and the walls of the vessel. These films, grounded through the wall of the vessel 1 and the conductor 30, carry current and rapidly become vaporized by the current flowing through them, as fully described in the foregoing patents. It will thus be seen that the circuit from the source 52 includes the coil 46, the conductor 6, the electrode 2, the films, the vessel 1 and conductor 30.

The solenoid valve 18—22 is so constructed as to take an open position when current is flowing in the winding 18. The micro-switch 32 is in a closed position when the armature 54 exerts little pressure on the arm 36 other than its weight. Increased current in the coil 46 is necessary to depress the armature 54 and open the switch 32. Decreased current permits the spring action within the micro-switch to return armature 54 to its original position. A variance of current is thus used to create a nearly constant volume of steam.

The amount of current flowing in the system increases as the quantity of volume of films 68 rises, since more conducting films are progressively formed. Such increased current will ultimately be sufficient to depress the armature 54. The current strength for this operation is predetermined by adjustment of the screw 60 and the nut 58, body of the switch 32 as previously set forth.

The increase of the films 68 to the required quantity and consuming a predetermined volume of current is an indication that there is sufficient water in the body of the vessel 1. At this time, the armature 54 is depressed as described, acting on the arm 36 to open the switch 32, de-energize the coil 18, close the valve 22, on seat 16 and cut off the supply of water to the vessel 1. Conversely, when the films have evaporated to reduce the column to a predetermined lesser quantity, less current will flow through the system, the armature 54 will rise, switch 32 will close, and the solenoid valve will open to admit more water.

*Although the invention has been disclosed in connection with a steam generating unit wherein two sides of the vessel 1 serve as electrodes of one potential and the central electrode 2 serves as an electrode of another potential between which films of liquid rise, it is obvious that, in practicing the invention, the vessel 1 need not necessarily function as one or more electrodes if two or more properly spaced electrodes are employed within a vessl with adjacent electrodes having opposite potentials.*

This method may be used to maintain water level in large steam boilers, etc. Also, the armature 54 may be a part of or connected directly to the valve 22, thereby eliminating the micro-switch.

What I claim is:

1. The method of balancing current volume and steam generation by use of current consuming and steam producing conducting films, consisting in mounting an electrode in initial surface contact with a body of liquid contained in a current-conducting vessel, whereby films of liquid rise between said electrode and the walls of said vessel, providing a fluid inlet to the bottom of said vessel with a valve in said inlet, incorporating in the circuit of said films and vessel an electrical means operable on pre-determined current strengths to actuate said valve, whereby the operation of said valve is dependent on the amount of current consumed by the varying quantity of said number of films in said vessel.

2. The method of balancing current volume and steam generation by use of current consuming and steam producing conducting films, consisting in mounting an electrode in initial surface contact with a body of liquid contained in a current-conducting vessel, whereby films of liquid rise between said electrode and the walls of said vessel, providing a fluid inlet to the bottom of said vessel with a valve in said inlet, incorporating in the circuit of said films and vessel a solenoid operable on pre-determined current strength and connected to said valve, whereby the operation of said valve is dependent on the amount of current consumed by the varying quantity of said number of films in said vessel.

3. The method of balancing current volume and steam generation by use of current consuming and steam producing conducting films, consisting in mounting an electrode in initial surface contact with a body of liquid contained in a current-conducting vessel, whereby films of liquid rise between said electrode and the walls of said vessel, providing a fluid inlet to the bottom of said vessel with a valve in said inlet, incorporating in the circuit of said films and vessel a solenoid operable on pre-determined current strength and connected to a micro-switch which in turn actuates said valve, whereby the operation of said valve is dependent on the amount of current consumed by the varying quantity of said number of films in said vessel.

*4. The method of balancing current volume and steam generation by use of current consuming and steam producing conducting films in a steam generator vessel including electrodes of opposite potential contacting a body of liquid therein, the said method consisting in mounting at least one electrode in initial surface contact with the body of liquid contained in said vessel whereby films of liquid rise between said electrodes, providing a fluid inlet to the bottom of said vessel with a valve in said inlet, incorporating in the circuit of said films and electrodes an electrical means operable on pre-determined current strengths to actuate said valve, whereby the operation of said valve is dependent on the amount of current consumed by the varying quantity of said number of films between said electrodes.*

*5. The method of balancing current volume and steam generation by use of current consuming and steam producing conducting films in a steam generator vessel including electrodes of opposite potential contacting a body of liquid therein, the said method consisting in mounting at least one electrode in initial surface contact with the body of liquid contained in said vessel whereby films of liquid rise between said electrodes, providing a fluid inlet to the bottom of said vessel with a valve in said inlet, incorporating in the circuit of said films and electrodes a solenoid operable on pre-determined current strength and connected to said valve, whereby the operation of said valve is dependent on the amount of current consumed by the varying quantity of said number of films between said electrodes.*

*6. The method of balancing current volume and steam generation by use of current consuming and steam producing conducting films in a steam generator vessel including electrodes of opposite potential contacting a body of liquid therein, the said method consisting in mounting at least one electrode in initial surface contact with the body of liquid contained in said vessel whereby films of liquid rise between said electrodes, providing a fluid inlet to the bottom of said vessel with a valve in said inlet, incorporating in the circuit of said films and electrodes a solenoid operable on pre-determined current strength and connected to a micro-switch which in turn actuates said valve, whereby the operation of said valve is dependent on the amount of current consumed by the varying quantity of said number of films in said vessel.*

*7. The method of balancing current volume and steam generation in a steam generating vessel including a fluid supply and electrodes of opposite potential consisting in mounting at least one electrode in initial surface contact with a body of liquid in said vessel whereby films of liquid will rise between said electrodes, and regulating said fluid supply responsive to the amount of current consumed by the varying quantity of said films rising between said electrodes.*

References Cited in the file of this patent or the original patent

UNITED STATES PATENTS

| | | |
|---|---|---|
| 1,665,793 | Sandborgh | Apr. 10, 1928 |
| 1,738,733 | Schur et al. | Dec. 10, 1929 |
| 2,488,787 | Watson | Nov. 22, 1949 |